US007399435B2

(12) United States Patent
Dünzinger et al.

(10) Patent No.: US 7,399,435 B2
(45) Date of Patent: Jul. 15, 2008

(54) METHOD AND DEVICE FOR PRODUCING HOLLOW BODIES OF PLASTIC

(75) Inventors: Bernhard Dünzinger, Schierling (DE); Klaus Voth, Obertraubling-piesenkofen (DE)

(73) Assignee: Krones AG, Neutraubling (DE)

( * ) Notice: Subject to any disclaimer, the term of this patent is extended or adjusted under 35 U.S.C. 154(b) by 774 days.

(21) Appl. No.: 10/737,293

(22) Filed: Dec. 16, 2003

(65) Prior Publication Data

US 2004/0159586 A1 Aug. 19, 2004

(30) Foreign Application Priority Data

Dec. 19, 2002 (DE) ............................. 102 59 589

(51) Int. Cl.
*B29C 49/78* (2006.01)
(52) U.S. Cl. ...................... 264/40.1; 264/234; 264/345; 264/523; 425/522; 425/169
(58) Field of Classification Search ................ 264/40.1, 264/234, 345, 523; 425/522, 169
See application file for complete search history.

(56) References Cited

U.S. PATENT DOCUMENTS

| 4,693,375 | A | | 9/1987 | Schweers | |
|---|---|---|---|---|---|
| 5,935,285 | A | * | 8/1999 | Lucas | 65/29.12 |
| 6,189,701 | B1 | * | 2/2001 | Winter | 209/523 |
| 6,584,805 | B1 | * | 7/2003 | Burns et al. | 65/29.12 |
| 6,620,352 | B1 | * | 9/2003 | Davis et al. | 264/40.4 |
| 6,863,860 | B1 | * | 3/2005 | Birckbichler et al. | 264/410 |

FOREIGN PATENT DOCUMENTS

DE 19737527 A1 3/1999

* cited by examiner

*Primary Examiner*—Suzanne E. McDowell
(74) *Attorney, Agent, or Firm*—Marshall, Gerstein & Borun LLP

(57) ABSTRACT

A process and a device for producing hollow bodies of plastic by stretch-blow molding heated parisons, in which the parisons are inspected before being heated and at least some of the defective parisons are heated and are not separated out until after being heated. This method and the respective device can be implemented at low cost and with low space requirements and it has only a minor negative effect on output of finished hollow bodies.

11 Claims, 3 Drawing Sheets

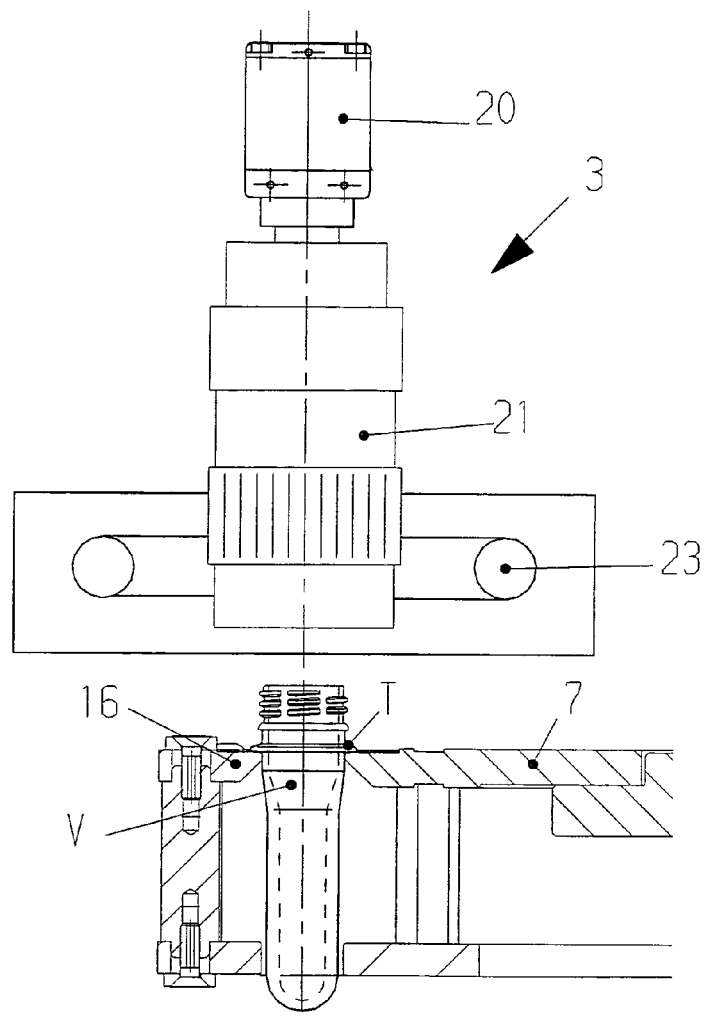
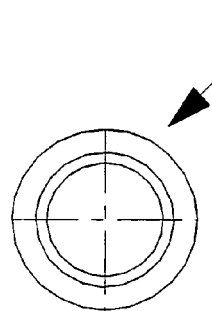
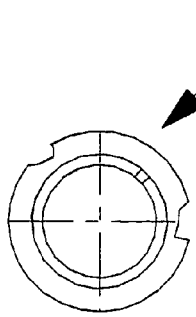
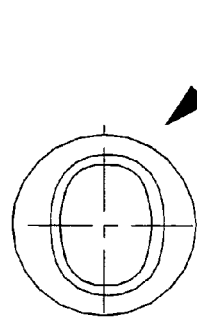

METHOD AND DEVICE FOR PRODUCING HOLLOW BODIES OF PLASTIC

FIELD OF THE INVENTION

This invention relates to a method of producing hollow bodies of plastic by stretch-blow molding of heated parisons as well as a device suitable for this purpose.

BACKGROUND OF THE INVENTION

A generic device is already known, in which both the inspection station and the sorting station connected to it are arranged at a considerable distance upstream from the heating station, so that all the defective parisons can be sorted out before being heated (German Patent 197 37 527 A1). The inspection station has its own drive motor, which ensures—through a special recovery control—that the gaps formed due to sorting out all the defective parisons are closed again before reaching the heating station. The heating station and the blow molding station are thus filled with parisons with no gaps between them and both stations operate at maximum output and maximum efficiency. However, the structural complexity and the space required with the known device are not insignificant and it is often difficult to integrate them, which is why this design with a separate parison inspector is not suitable for all applications, despite its advantages.

On the other hand, it is already known that a mechanical inspection station with a sorting function may be integrated into the intake star wheel of the heating station (U.S. Pat. No. 4,693,375). Here again, all the parisons which are rejects are sorted out before the heating station, but the gaps that result from this sorting continue all the way through the heating station and the blow molding station. Depending on how many defective parisons must be sorted out, this has a more or less negative effect on efficiency and output. In addition, heating of the parisons in front of and following such gaps is disturbed as a result of the gaps between the parisons in the heating station, which therefore also results in defects in the completely blow-molded hollow bodies, e.g., beverage bottles.

SUMMARY OF THE INVENTION

The object of this invention is to create a generic method and a generic device for producing hollow bodies made of plastic, which can be implemented at a low cost and without taking up much space while on the other hand interfering as little as possible with the sorting of finished hollow bodies.

According to this invention, even defective parisons are intentionally heated at least partially and are sorted out just prior to the blow molding operation. Therefore, heating of the adjacent non-defective parisons is not disturbed. The efficiency of this method and machine is impaired only slightly. Inspection and sorting out can be optimally integrated into the blow molding process and/or the blow molding machine. No separate and expensive parison inspector is necessary. Nevertheless, all the parisons which are not suitable for production can be sorted out reliably.

It is particularly advantageous if, according to a refinement of this invention, only those defective parisons which will not cause any problems during heating are sorted out after heating. This is the case, for example, with parisons having a defective supporting ring, a defective sealing surface or a slightly oval mouth which can still be placed without any problem on the usual holding mandrels conventionally provided in heating stations for conveyance of the parison. However, grossly defective parisons, e.g., those with a severely oval mouth or a closed mouth that cannot be placed on the holding mandrels are then sorted out already before the heating stage. In this way, the remaining gaps in heating are reduced to the absolutely necessary minimum. There is no problem in differentiating between the two defective classes of parisons in particular when using optoelectric scanning and digital signal processing. In this way, a defective parison is removed at the best location, depending on the type of defect.

BRIEF DESCRIPTION OF THE DRAWINGS

An exemplary embodiment of this invention is described below with reference to the drawings, which show:

FIG. 3 shows a side view of the inspection station of the stretch-blow molding machine according to FIG. 1, partially in sectional view;

FIG. 4 shows a top view of a satisfactory parison;

FIG. 5 shows a top view of a slightly defective device parison;

FIG. 6 shows a top view of a severely defective parison.

DETAILED DESCRIPTION OF THE INVENTION

Figure 1:
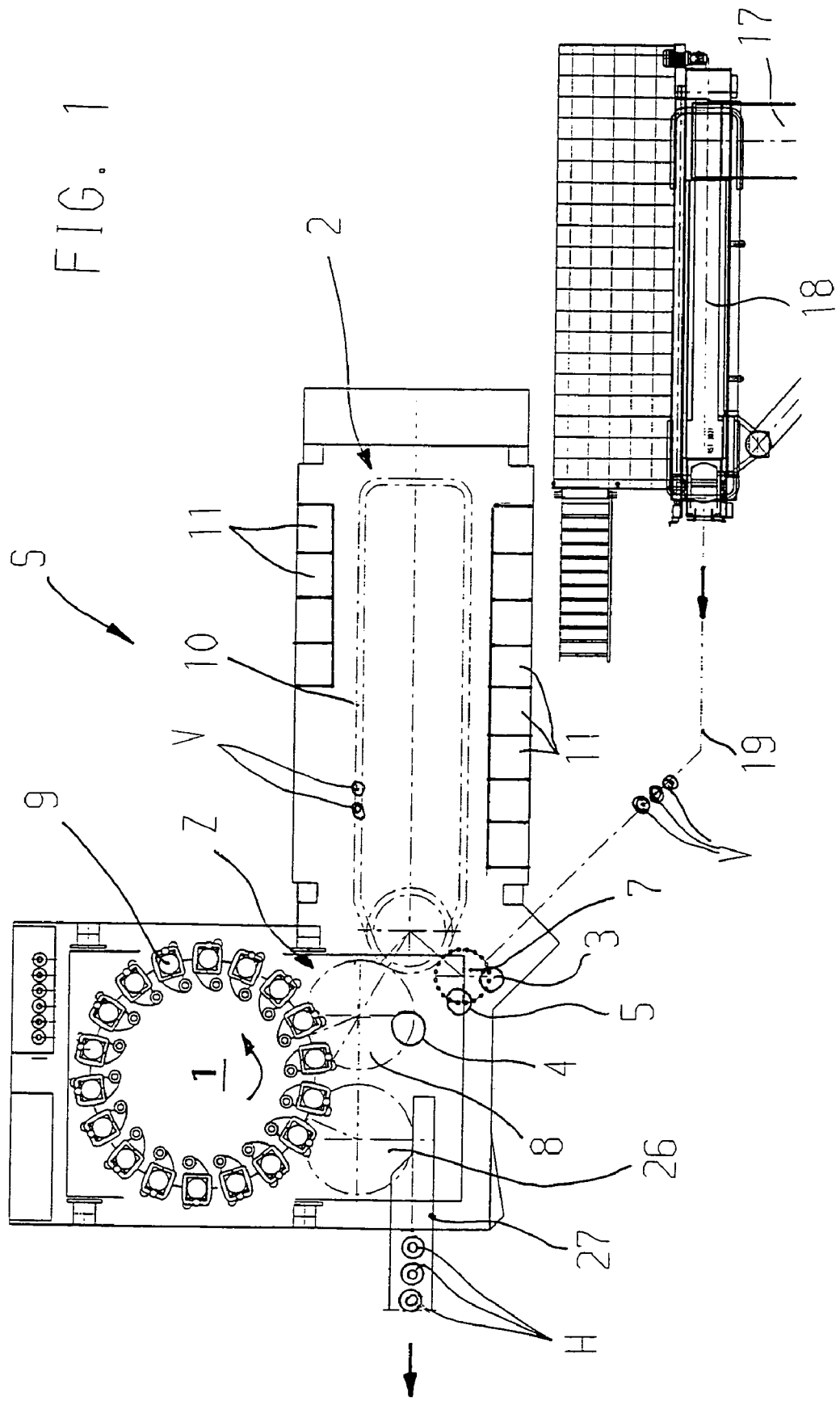
FIG. 1 shows a schematic top view of a stretch-blow molding machine.
Figure 2:
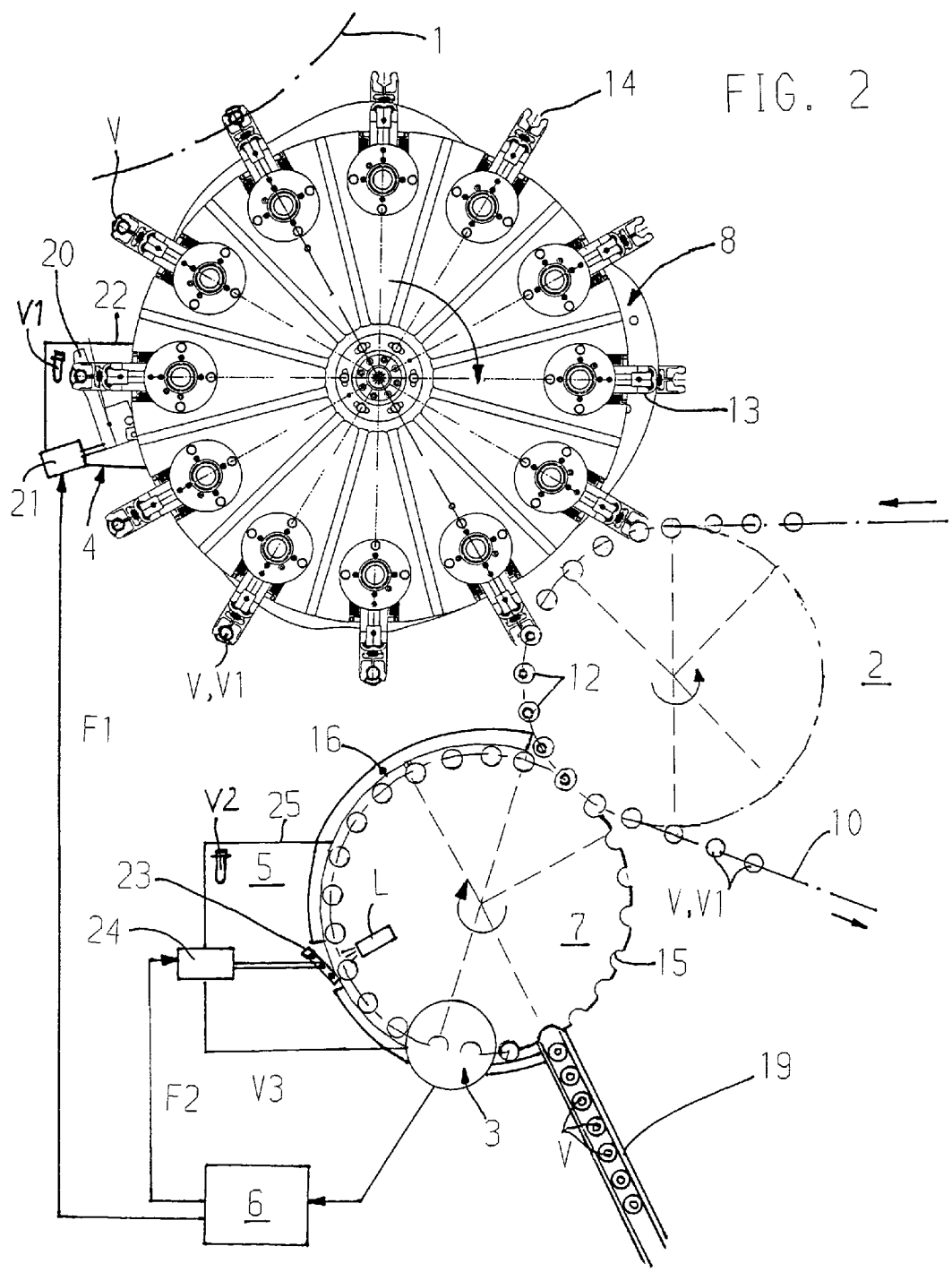
FIG. 2 shows an enlarged diagram of detail Z according to FIG. 1.

The stretch-blow molding machines S according to FIGS. 1 through 3 have a blow molding station 1 in the form of a blow molding wheel which can be driven continuously in the direction of the arrow and is fitted with several blow-molding molds 9; it also has an upstream heating station 2 with a conveyance chain 10, which rotates continuously in the direction of the arrow, for the parisons V and stationary infrared heating boxes 11.

The heated parisons V are transferred between the holding mandrels 12 of the conveyor chain 10, where the mandrels can extend elastically into the interior of the parisons V, and the blow-molding molds 9 by means of a transfer star wheel 8, which rotates continuously in the direction of the arrow and is equipped with a plurality of gripper arms 13 that can be controlled radially and tangentially. Elastic gripper tongs 14 are arranged on the outer ends radially of the gripper arms 13 and act beneath the supporting ring T of the parsons V.

The parisons V are supplied to the holding mandrels 12 of the conveyor chain 10 by an intake star wheel 7, which can be driven continuously in the direction of the arrow and is equipped with pockets 15 having a sawtooth shape. The parisons V are held in the pockets by a stationary guide sector 16 until they have been picked up by the holding mandrels 12 lowered into them.

The blow molding machine S also includes a magazine 17 for the parisons V having a roller sorting device 18, which inserts the parisons individually one after the other and in an upright normal position into a chute 19, which is inclined downward and consists essentially of two guide rails acting beneath the supporting ring T of the parisons V and ends on the circumference of the intake star wheel 7, which picks up the front parison V with its pockets 15 and conveys it further.

An optoelectric inspection station 3 for the parisons V is situated in the revolving area of the intake star wheel 7, which is connected to the chute 19. This inspection station has a CCD camera 20, which is mounted in a stationary position above the path of movement of the parisons and has a lens system 21 and a lighting device 13. The camera 20 creates an image of the mouth and the supporting ring of each parison V as it passes by, and then this image is analyzed and classified in real time in an electronic analyzer device 6 connected to the camera. The analyzer device 6, which is supported by a microprocessor, is programmed so that a first error signal F1 is generated on inspection of a slightly defective parison V1 according to FIG. 5 having defects on the sealing surface and/or on the supporting ring and/or having slightly oval mouth. A second error signal F2 is generated when a parison V2 according to FIG. 6 having a severely oval mouth or even a closed mouth or just a partially open mouth is inspected, regardless of whether or not the sealing surface and the supporting ring are damaged. No error signal is generated when an acceptable parison V according to FIG. 4 having a circular mouth, which is free of defects, and an undamaged supporting ring is inspected.

The electronic analyzer device 6 described above controls two sorting stations 4 and 5. The first sorting station 5 is assigned to the transfer star wheel 8 and is provided in the peripheral area of the parisons V between the heating station 2 and the blow molding station 1. The additional second sorting station 5 is assigned to the intake star wheel 7 and is provided in the peripheral area of the parisons V between the inspection station 3 and the heating station 2.

The first sorting station 4 has a switch tongue 20, which can be pivoted like a lever and has an actuator element 21, e.g., an electropneumatic actuator element 21, that acts on it and can be moved between two positions at a high speed. This moves the switch tongue 20 back and forth between the reject position shown in FIG. 2 and a neutral position which is closer to the axis of rotation of the transfer star wheel 8. In the neutral position, the parisons V can pass through the sorting station 4 and/or the switch tongue 20 without being illuminated. However, if the switch tongue 20 assumes the reject position, it acts on a parison passing by, gripping it just beneath the supporting ring T and pressing it out of the elastic gripper tongs 14. The parison V1 thus sorted out drops into a first collecting container 22

The second sorting station 5 has a guide piece 23 which can be pivoted like a lever and is inserted into an opening in the stationary guide arc 16; this guide piece 23 can be moved back and forth at a high speed by an electropneumatic actuator element 24 or the like between a neutral position in which it closes the gap in the guide sheet 16 and a reject position in which it releases the gap in the guide sheet 16. In the neutral position of the guide piece 23, the parisons V passing by are held in the pockets 15 and continue to travel on to the heating station 2 without being illuminated. In the reject position, however, the parisons can fall outward through the gap thus opened in the guide sheet 16 under the influence of their own weight and centrifugal force, and this is supported by an air jet L if necessary. The rejected parisons V2 are collected in a second collecting container 25.

The function of the device described above and the method carried out with it are as described below:

The parisons V made of injection-molded PET are fed in a disorganized manner and at normal room temperature into the magazine 17, and after being aligned and sorted by the roller sorter 18, they are sent to the intake star wheel 7 via the chute 19 by means of a hanging drive. At the intake star wheel, the parisons are picked up individually by the sawtooth pockets 15 one after the other and moved along the stationary guide sector 16. As they pass by the inspection station 3, the head area of each parison V is inspected electrooptically. If the mouth sealing surface and supporting ring are undamaged and if the mouth is completely open and not deformed, there is no response on the part of the analyzer device 6 and the defect-free parison V passes on to the transfer station to the heating station 2, where the parisons are picked up by insertion of the holding mandrels 12 of the conveyor chain 10 and then pass through the heating boxes 11 of the heating station 2, where they are heated to the desired processing temperature of approximately 100° C. After passing through a conditioning zone where there are no heating boxes the parisons approach the transfer star wheel 8 and are gripped and held by the controlled gripper arms having the elastic gripper tongs 14 one after the other, whereupon the holding mandrels 12 are removed by pulling them upward out of the parisons V. Then the defect-free parisons V move on to the blow molding station 1 where they are placed in the opened blow molding molds 9. Then the blow-molding molds 9 are closed and the parisons V are molded to form the bottle-shaped hollow bodies H by mechanical stretching and molding with both low-pressure and high-pressure blow molding air in the traditional manner. After cooling, they are removed from the opened blow-molding molds 9, e.g., by a discharge star wheel 26, which is designed like the transfer star wheel 8, and then they are transferred by this to a discharge conveyor 27 for the finished hollow bodies H.

If a slightly defective parison V1 according to FIG. 5 with damage to the mouth and/or the supporting ring and/or with a slightly oval but still open If a slightly defective parison V1 according to FIG. 5 with damage to the mouth and/or the supporting ring and/or with a slightly oval but still open mouth is inspected in the inspection station 3, then the analyzer device 6 generates a first error signal F1 which is relayed to the first sorting device 4 with a time lag which depends on the conveyance distance between the inspection device 3 and the first sorting device 4. First, however, the slightly defective parison V1, just like a defect-free parison V, passes by the second sorting station 5 which is in neutral position and then is fed into the heating station 2, where it is heated to the processing temperature. Then the slightly defective parison is transferred to the transfer star wheel 8 in the same way as a defect-free parison V would be transferred. Only on reaching the first sorting station 4 is the slightly defective parison V1, which has been heated to the normal processing temperature, sorted out by actuation of the switching tongue 20 in the manner described above and thereby removed from further processing in the blow molding station 1. Accordingly, the blow-molding mold 9, which would normally receive the defective parison V1, does not receive any parison in this case. However, the preceding and following blow-molding molds 9 are filled with defect-free parisons V, which have been brought to their temperature profile in the normal way, because the defective parison V1, which has been removed at the sorting station 4, has not caused any gap in the area of the heating station 2.

If a seriously defective parison V2 according to FIG. 6 on which the mouth is closed entirely or partially or is extremely oval is inspected by the inspection station 3, the analyzer device 6 generates a second error signal F2 for the second sorting station 5 with a time lag which corresponds to the conveyance distance between the inspection station 3 and the sorting station 5. Such seriously defective parisons V2 could not then be transferred properly from the holding mandrels 12 that are insertable into the mouth of the parison and are mounted on the conveyor chain 10; instead, they might cause problems at the transfer point between the intake star wheel 7 and the conveyor chain 10. These parisons V2 are therefore sorted out in the manner described above by pivoting out the guide piece 23 in the second sorting station 5 shortly after passing through the inspection station 3. This results in a gap, which continues on through the heating station 2. This gap can cause an unwanted change in temperature on the defect-free parison V in front of the gap and the one in back of the gap, so that it is also expedient to eliminate these two parisons V from further processing in the blow molding station 1. To this end, the electronic analyzer device 6 automatically triggers an error signal F1 for the parison V in front of the gap and the one following the gap whenever an error signal F2 is generated for a parison V2, regardless of whether these parisons are absolutely free of defects or only slightly defective. However, this step of the method is limited to the case of a closed mouth, etc., which is relatively rare because of the good quality control by the parison manufacturers, and therefore this is not a very common case. However, the slightly defective parisons V1 occur more frequently, because such defects can also be caused by transport to the bottle manufacturer or the like.

The sorting out of severely defective parisons can also be shifted to the intake area of the heating station, where the holding mandrels can act as measurement mandrels or ejectors by automatically ejecting parisons that have a constricted or oval mouth. The additional sorting station 5 may then be eliminated. Severely defective parisons may also be heated in the heating station in the same way as slightly defective parisons and then separated only in the first sorting station on the transfer star wheel if the design of the heating station allows this. This is the case for example when the transport chain 10 is provided with gripper tongs that act on the outside of the parisons. In any case, production of acceptable hollow bodies is reduced only inasmuch as absolutely necessary by the method according to this invention and the device according to this invention.

The invention claimed is:

1. A method of producing hollow bodies (H) of plastic by stretch-blow molding heated parisons (V), where the parisons are inspected and defective parisons are sorted out, the method comprising:
    inspecting the parisons (V) before heating the parisons;
    heating the parisons (V) which can be transported; and
    sorting out at least some defective parisons (V) after heating the parisons.

2. The method according to claim 1, wherein sorting out at least some defective parisons after heating the parisons comprises sorting out defective parisons (V) which can be mounted on holding mandrels.

3. The method according to claim 2, wherein sorting out at least some defective parisons after heating the parisons comprises sorting out defective parisons (V) having a slightly oval mouth.

4. The method according to claim 2, further comprising sorting out acceptable parisons (V), which are adjacent to a gap created by sorting out a defective parison (V) before being heated, after being heated.

5. The method according to claim 2, further comprising sorting out defective parisons (V) which cannot be mounted on holding mandrels before heating the parisons.

6. The method according to claim 5, wherein sorting out defective parisons (V) which cannot be mounted on holding mandrels before heating the parisons comprises sorting out defective parisons with a markedly oval or constricted mouth.

7. A device for producing hollow bodies (H) from plastic by stretch-blow molding heated parisons (V), the device comprising:
    a heating station (2),
    a blow molding station (1) that is situated downstream of the heating station,
    an inspection station (3) that is situated upstream of the heating station, and
    a first sorting station (4) which is controllable by the inspection station (3), the first sorting station situated between the heating station (2) and the blow molding station (1) for sorting out defective parisons (V).

8. The device according to claim 7, further comprising a second sorting station (5) which is also controllable by the inspection station (3), the second sorting station situated between the inspection station (3) and the heating station (2) for sorting out defective parisons (V).

9. The device according to claim 8, wherein the inspection station (3) comprises an analyzer device (3) which differentiates between defective parisons (V) having one of a defect-free or only a slightly oval mouth and defective parisons (V') having one of a markedly oval or constricted mouth, wherein the analyzer device causes the second sorting station to sort out the defective parisons (V) having a markedly oval or constricted mouth.

10. The device according to claim 7, wherein the inspection station (3) is situated at an intake star wheel (7) which is situated upstream from the heating station (2) and wherein the sorting station (4) is situated at a transfer star wheel (8) which is situated between the heating station (2) and the blow molding station (1).

11. The device according to claim 10, further comprising further comprising a second sorting station (5) which is also controllable by the inspection station (3), the second sorting station situated between the inspection station (3) and the heating station (2) for sorting out defective parisons (V), and a third sorting station (5) located at the intake star wheel (7).

* * * * *

UNITED STATES PATENT AND TRADEMARK OFFICE
CERTIFICATE OF CORRECTION

PATENT NO. : 7,399,435 B2
APPLICATION NO. : 10/737293
DATED : July 15, 2008
INVENTOR(S) : Bernhard Dünzinger et al.

It is certified that error appears in the above-identified patent and that said Letters Patent is hereby corrected as shown below:

On the Title Page:

Item (30), "102 59 589" should be -- 10259589.5 --.

At Column 6, lines 43-44, "further comprising further comprising" should be -- further comprising --.

Signed and Sealed this

Twenty-fifth Day of November, 2008

JON W. DUDAS
*Director of the United States Patent and Trademark Office*